US011223889B2

(12) United States Patent
Provost et al.

(10) Patent No.: US 11,223,889 B2
(45) Date of Patent: Jan. 11, 2022

(54) AUDIO DEVICE WITH VIBRATIONALLY ISOLATED TRANSDUCER

(71) Applicant: Bose Corporation, Framingham, MA (US)

(72) Inventors: Zachary David Provost, Marlborough, MA (US); Liam Robert Kelly, Milton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 16/714,925

(22) Filed: Dec. 16, 2019

(65) Prior Publication Data

US 2021/0185423 A1    Jun. 17, 2021

(51) Int. Cl.
| H04R 25/00 | (2006.01) |
| H04R 1/02 | (2006.01) |
| H04R 1/10 | (2006.01) |
| H04R 1/04 | (2006.01) |
| H04R 1/08 | (2006.01) |

(52) U.S. Cl.
CPC ............. *H04R 1/1008* (2013.01); *H04R 1/04* (2013.01); *H04R 1/08* (2013.01); *H04R 1/1075* (2013.01); *H04R 2400/11* (2013.01); *H04R 2460/09* (2013.01)

(58) Field of Classification Search
CPC .............. H04R 25/00; H04R 2225/023; H04R 2225/025; H04R 1/02; H04R 1/105; H04R 1/08
USPC .......................... 381/327–328, 367–368, 381
See application file for complete search history.

(56) References Cited

U.S. PATENT DOCUMENTS

| 2,930,858 | A | * | 3/1960 | Hollingsworth | ....... | G02C 11/06 |
| | | | | | | 381/23.1 |
| 3,048,668 | A | | 8/1962 | Weiss | | |
| 3,247,330 | A | * | 4/1966 | Hinman | ................. | G02C 11/06 |
| | | | | | | 381/381 |
| 5,159,639 | A | * | 10/1992 | Shannon | ................ | G02C 11/06 |
| | | | | | | 381/327 |
| 7,233,676 | B2 | * | 6/2007 | Bayer | .................... | H04R 25/65 |
| | | | | | | 381/328 |
| 10,728,649 | B1 | | 7/2020 | Holman | | |
| 2017/0227793 | A1 | | 8/2017 | Marc | | |

FOREIGN PATENT DOCUMENTS

EP        3051841 A1    8/2016

OTHER PUBLICATIONS

PCT International Search Report and Written Opinion for International Application No. PCT/US2020/065216, dated May 18, 2021, 22 pages.

* cited by examiner

*Primary Examiner* — Suhan Ni
(74) *Attorney, Agent, or Firm* — Hoffman Warnick LLC (57) ABSTRACT

Various aspects include wearable out-loud audio devices in various form factors. Additional implementations include methods of forming wearable out-loud audio devices. Further implementations include storage media with code representative of a suspension system for a wearable out-loud audio device. Particular aspects include a wearable out-loud audio device having: a frame; a transducer mounted to the frame; a microphone mounted to the frame and separated from the transducer by a distance; and a suspension system for the transducer to vibrationally isolate the transducer from the microphone.

18 Claims, 7 Drawing Sheets

AUDIO DEVICE WITH VIBRATIONALLY ISOLATED TRANSDUCER

TECHNICAL FIELD

This disclosure generally relates to wearable out-loud audio devices in various form factors.

BACKGROUND

Wearable out-loud audio devices, such as off-ear headphones, produce sound using an electro-acoustic transducer (or, loudspeaker) that is spaced from the user's ear. These audio devices may take various form factors, and in certain cases, include a microphone for voice or ambient acoustic signal pickup. The microphone and loudspeaker are commonly mounted on the same frame. However, these devices can present challenges in terms of acoustically and mechanically isolating the device microphone from the loudspeaker(s).

SUMMARY

All examples and features mentioned below can be combined in any technically possible way.

Various implementations of the disclosure include wearable out-loud audio devices in various form factors, e.g., audio eyeglasses, over-ear wearables, and other out-loud wearable audio devices such as may be worn on the head or about the neck or shoulders. Additional implementations include methods of forming wearable out-loud audio devices such as hearing assistance devices. Further implementations include storage media with code representative of a suspension system for a wearable out-loud audio device.

In some particular aspects, a wearable out-loud audio device includes: a frame; a transducer mounted to the frame; a microphone mounted to the frame and separated from the transducer by a distance; and a suspension system for the transducer to vibrationally isolate the transducer from the microphone.

In other particular aspects, an audio eyeglass device includes: a frame having a lens region and a pair of arms extending from the lens region for positioning over a user's ears; at least one transducer mounted on the pair of arms and positioned proximate the user's temple region in a head-worn state; a microphone mounted to the frame and separated from the transducer by a distance; and a suspension system for the transducer to vibrationally isolate the transducer from the microphone.

In additional particular aspects, a method of manufacturing a suspension system for a wearable out-loud audio device includes: additively manufacturing a compliant material configured to fit between an outer surface of a transducer and a frame of the wearable out-loud hearing assistance device.

In further particular aspects, a non-transitory computer readable storage medium storing code representative of suspension system for a wearable out-loud audio device is disclosed. The suspension system is physically generated upon execution of the code by a computerized additive manufacturing system, the code including: code representing the suspension system, the suspension system including a compliant material configured to be located between an outer surface of a transducer and a frame for the wearable out-loud audio device.

Implementations may include one of the following features, or any combination thereof.

In certain implementations, the suspension system is coupled to the frame and the transducer.

In particular aspects, the frame includes a glasses frame having a set of arms for resting over a user's respective ears, and a lens region spanning between the arms, where the transducer is located on at least one of the arms proximate one of the user's ears, where the microphone is located on the at least one arm proximate the lens region, and where the distance is measured along the frame.

In some cases, the frame includes an over-ear audio device frame.

In certain aspects, the distance between the microphone and the transducer is equal to at least approximately 5 centimeters as measured along the frame.

In some implementations, during operation of the device, the suspension system provides greatest vibrational isolation across a frequency range of output at the transducer of approximately 200 Hertz (Hz) to approximately 4,000 Hz.

In certain cases, the suspension system enhances a real ear insertion gain (REIG) at the microphone across the frequency range.

In particular aspects, the suspension system is formed of an additively manufactured material.

In certain cases, the suspension system includes silicone.

In some aspects, the suspension system includes a compliant material located between an outer surface of the transducer and the frame, where the compliant material contacts the outer surface of the transducer at a plurality of locations.

In particular implementations, the device further includes: a power source located in the frame; and at least two conductors coupling the power source to the transducer.

In certain aspects, the suspension system mitigates detected vibration from the transducer at the microphone.

In some cases, the device further includes at least one additional transducer mounted to the frame, and at least one additional suspension system to vibrationally isolate the additional transducer from the microphone.

In particular implementations, the transducer is disposed such that, in a head-worn state, the transducer is in an open-ear configuration in which an ear canal of a user of the device is unobstructed.

In certain cases, the microphone is configured to capture acoustic signals that are processed and played back through the transducer.

In some aspects, the transducer and the microphone are disposed in the device such that, in the head-worn state, a lobe of a radiation pattern of the transducer is directed towards the ear canal of the user, and the microphone is positioned in an acoustic null in the radiation pattern of the transducer.

In particular cases, the method of manufacturing the suspension system further includes coupling the compliant material to the transducer and the frame such that the compliant material at least partially surrounds the transducer.

In certain implementations, the compliant material is coupled to the transducer and the frame at a plurality of locations around the transducer so as to dampen vibration from the transducer to the frame.

Two or more features described in this disclosure, including those described in this summary section, may be combined to form implementations not specifically described herein.

The details of one or more implementations are set forth in the accompanying drawings and the description below.

Other features, objects and advantages will be apparent from the description and drawings, and from the claims.

It is noted that the drawings of the various implementations are not necessarily to scale. The drawings are intended to depict only typical aspects of the disclosure, and therefore should not be considered as limiting the scope of the invention. In the drawings, like numbering represents like elements between the drawings.

DETAILED DESCRIPTION

As noted herein, various aspects of the disclosure relate to wearable out-loud audio devices (e.g., wearable out-loud hearing assistance devices). More particularly, aspects of the disclosure relate to vibrational isolation in wearable out-loud audio devices.

In designing wearable out-loud hearing assistance devices (or simply, hearing assistance devices), engineers strive to enhance microphone input in order to provide maximum desired hearing assistance. The greatest possible gain that can be applied to the microphone input before the acoustic system becomes unstable is called the maximum stable gain, or MSG. In many form factors, MSG is affected by both audio feedback (e.g., audio feedback from transducers at the device) and vibrational feedback (e.g., vibration caused by audio output at the transducers). For example, vibration from one or more transducers (or, loudspeakers) can propagate through the device's frame and affect pickup at the microphone(s).

Various implementations include audio devices such as out-loud hearing assistance devices that vibrationally isolate the transducer(s) from one or more microphones for stabilizing the gain applied to the audio signal from the microphone(s). In particular cases, the audio device includes a suspension system for the transducer that vibrationally isolates the transducer from the microphone(s).

Commonly labeled components in the FIGURES are considered to be substantially equivalent components for the purposes of illustration, and redundant discussion of those components is omitted for clarity.

Aspects and implementations disclosed herein may be applicable to a wide variety of audio devices (e.g., wearable out-loud hearing assistance devices) in various form factors, such as headphones, eyeglasses, neck-worn speakers, shoulder-worn speakers, body-worn speakers, etc. Unless specified otherwise, the terms wearable out-loud hearing assistance device and wearable audio device (or collectively, "audio device"), as used in this document, include headphones and various other types of personal audio devices such as head, shoulder or body-worn acoustic devices that include one or more acoustic drivers to produce sound without entering or occluding the earway (or ear canal) of a user. Some particular aspects disclosed may be particularly applicable to personal (wearable) out-loud audio devices such as eyeglasses or other head-mounted audio devices. It should be noted that although specific implementations of wearable out-loud audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage. One example of such a device is described in U.S. patent application Ser. No. 16/534,588 (Microphone Placement in Open Ear Hearing Assistance Devices, filed on Aug. 7, 2019), which is hereby incorporated by reference in its entirety.

As noted herein, off-ear headphones such as wearable out-loud audio devices produce sound using an acoustic driver that is spaced (or, separated) from the ear of the user while in use. Audio eyeglasses (also referred to as eyeglass headphones) can include one or more dipole loudspeakers built into the eyeglass frame. Dipole loudspeakers produce out-of-phase sound from opposite sides of the loudspeaker's electro-acoustic transducer. The sound can be emitted from openings or vents in the eyeglass frame. If one vent is close to an ear and the other vent is farther from the ear, quality sound can be delivered to the ear with minimal spillage. Examples of off-ear headphones with dipole loudspeakers are disclosed in U.S. Pat. No. 9,794,676 and U.S. patent application Ser. No. 15/375,119, both of which are herein incorporated by reference in their entireties. Additional aspects of off-ear headphones are described in U.S. patent application Ser. No. 15/884,924, which is herein also incorporated by reference in its entirety. Additionally, designs of particular off-ear headphones are included in U.S. Design patent application Ser. No. 29/639,191 (Attorney Docket No. OG-18-041-US), which is also incorporated by reference herein in its entirety. Further details about particular hearing assistance devices, e.g., headphones for enhancing conversational functions, are included in U.S. Pat. No. 9,560,451, which is also incorporated by reference herein in its entirety.

While described as audio eyeglasses, or eyeglass headphones, the wearable out-loud audio devices disclosed herein can include additional features and capabilities. That is, the wearable out-loud audio devices described according to various implementations can include features found in one or more other wearable electronic devices, such as smart glasses, smart watches, etc. These wearable out-loud audio devices can include additional hardware components, such as one or more cameras, location tracking devices, microphones, etc., and may be capable of voice recognition, visual recognition, and other smart device functions. The description of audio eyeglasses included herein is not intended to exclude these additional capabilities in such a device.

Figure 1:
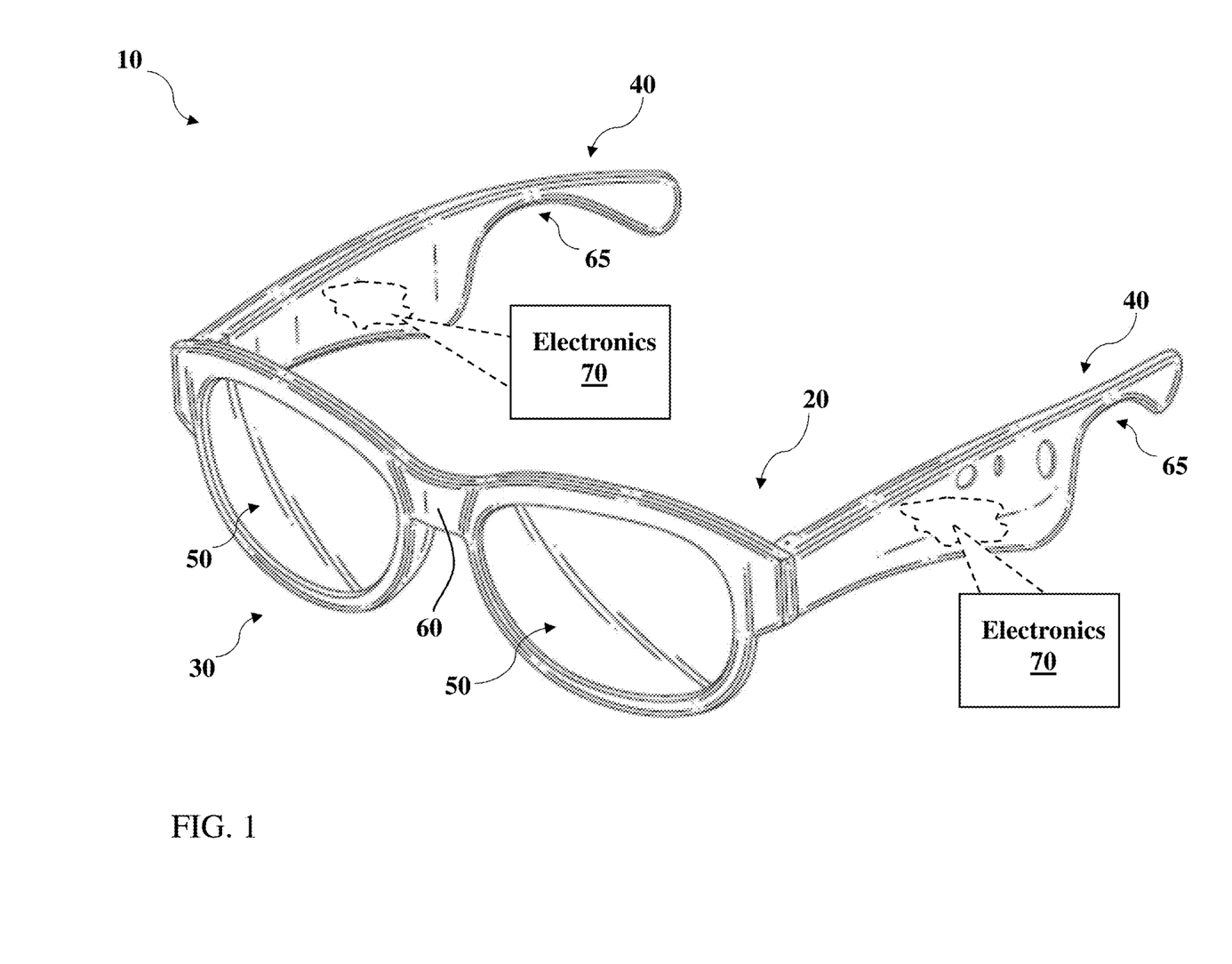
FIG. 1 shows a schematic depiction of a wearable out-loud audio device according to various implementations.

FIG. 1 is a schematic depiction of a wearable out-loud audio device (e.g., a hearing assistance device) 10 according to various implementations. In some cases, the wearable out-loud audio device is referred to as a hearing assistance device, or simply, a device 10. In the example depiction in FIG. 1, the device 10 includes audio eyeglasses. As shown in this example implementation, the device 10 can include a frame 20 having a lens region 30 and a pair of arms 40 extending from the lens region 30. The lens region 30 and arms 40 are designed for resting on the head of a user. The lens region 30 can include a set of lenses 50, which can include prescription, non-prescription and/or light-filtering lenses, as well as a bridge 60 (which may include padding) for resting on the user's nose. Arms 40 can include a contour 65 for resting on the user's respective ears. Contained within the frame 20 (or substantially contained, such that a component can extend beyond the boundary of the frame) are electronics 70 and other components for controlling the device 10 according to particular implementations. In some cases, separate, or duplicate sets of electronics 70 are contained in portions of the frame, e.g., each of the respective arms 40 in the frame 20. However, certain components described herein can also be present in singular form.

Figure 2:
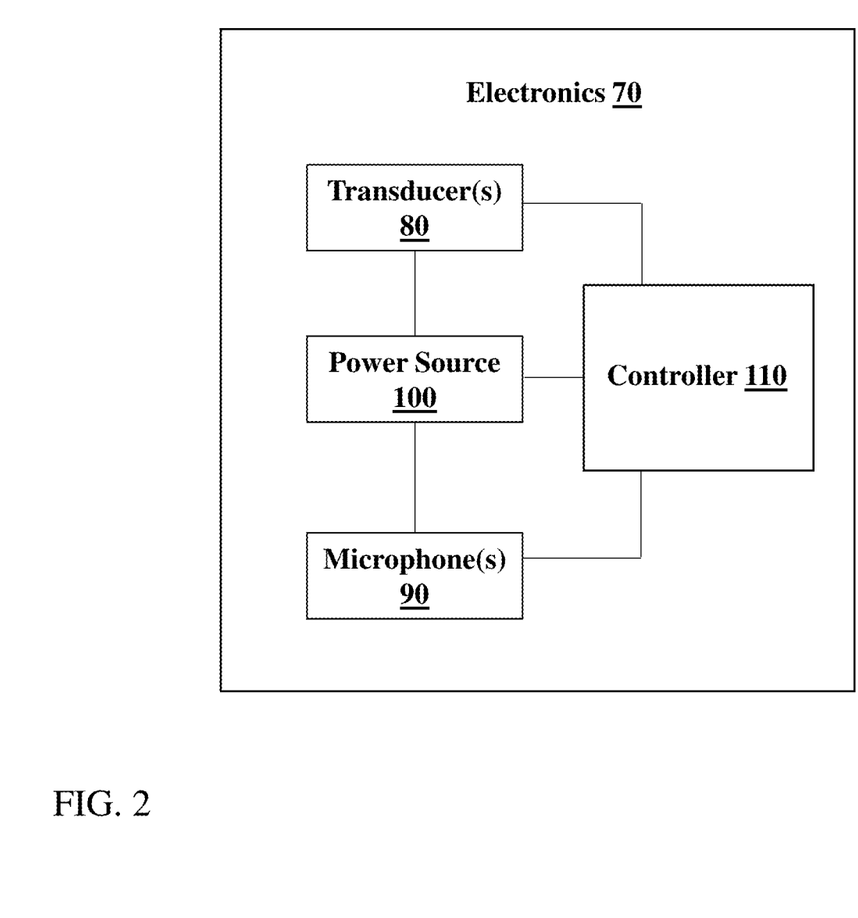
FIG. 2 is a schematic depiction of select electronics substantially contained in the wearable out-loud audio device of FIG. 1.

FIG. 2 shows a schematic depiction of the electronics 70 contained within the frame 20 (FIG. 1). It is understood that one or more of the components in electronics 70 may be implemented as hardware and/or software, and that such components may be connected by any conventional means (e.g., hard-wired and/or wireless connection). It is further understood that any component described as connected or coupled to another component in audio eyeglasses 10 or other systems disclosed according to implementations may communicate using any conventional hard-wired connection and/or additional communications protocols. In some cases, communications protocol(s) can include a Wi-Fi protocol using a wireless local area network (LAN), a communication protocol such as IEEE 802.11 b/g/n, a cellular network-based protocol (e.g., third, fourth or fifth generation (3G, 4G, 5G cellular networks) or one of a plurality of internet-of-things (IoT) protocols, such as: Bluetooth, BLE Bluetooth, ZigBee (mesh LAN), Z-wave (sub-GHz mesh network), 6LoWPAN (a lightweight IP protocol), LTE protocols, RFID, ultrasonic audio protocols, etc. In various particular implementations, separately housed components in audio eyeglasses 10 are configured to communicate using one or more conventional wireless transceivers.

As shown in FIG. 2, electronics 70 contained within the frame 20 (FIG. 1) can include at least one transducer (or, loudspeaker) 80, at least one microphone 90 (e.g., an array of microphones), and a power source 100. In various implementations, the power source 100 is connected to the transducer 80, and can additionally be connected to the microphone(s) 90. Each of the transducer 80, microphone(s) 90 and power source 100 are connected with a controller 110, which is configured in various implementations to control hearing assistance functions. Electronics 70 can include other components not specifically depicted herein, such as communications components (e.g., a wireless transceiver (WT)) configured to communicate with one or more other electronic devices connected via one or more wireless networks (e.g., a local WiFi network, Bluetooth connection, or radio frequency (RF) connection), motion and/or location detection components (e.g., global positioning system (GPS) tracking systems and/or an inertial measurement unit (IMU), and interfaces (e.g., tactile interfaces such as capacitive touch interfaces), amplification and signal processing components. It is understood that these components or functional equivalents of these components can be connected with, or form part of, the controller 110.

The transducer 80 can include at least one electroacoustic transducer for producing an acoustic output proximate the ears of a user. In some particular cases, at least two electroacoustic transducers 80 are positioned proximate (but physically separated from) the ears of the user (e.g., one transducer 80 proximate each ear). However, it is understood that in other cases, transducers 80 can be positioned extending from arms 40 such that they physically contact the ears of the user. In certain implementations, each transducer 80 can include a dipole loudspeaker with an acoustic driver or radiator that emits front-side acoustic radiation from its front side, and emits rear-side acoustic radiation to its rear side. The dipole loudspeaker can be built into the frame 20 of the audio eyeglasses 10 (FIG. 1). A housing can direct the front-side acoustic radiation and a housing can direct the rear-side acoustic radiation. A plurality of sound-conducting vents (openings) in the housing allow sound to leave the housing. Openings in the eyeglass frame 20 can be aligned with these vents, so that the sound also leaves the frame 20. In these cases, a distance between the sound-conducting openings defines an effective length of an acoustic dipole of the loudspeaker. The effective length may be considered to be the distance between the two openings that contribute most to the emitted radiation at any particular frequency. The housing and its openings can be constructed and arranged such that the effective dipole length is frequency dependent. In certain cases, the transducer 80 (e.g., loudspeaker dipole transducer) is able to achieve a greater ratio of sound pressure delivered to the ear to spilled sound, as compared to an off-ear headphone not having this feature. Additional features of open-ear headphone and head-worn acoustic devices are illustrated in U.S. Pat. Nos. 9,794,676 and 9,794,677, both of which are incorporated by reference herein in their entirety.

The microphone(s) 90 can include one or more microphones, such as an array of microphones. The microphone(s) 90 can be used to capture audio preferentially from a particular direction. For example, each of the microphones in an array can be inherently directional that capture acoustic signals from a particular direction. In other examples, the acoustic signatures captured by the microphone(s) can be processed (e.g., using a smart antenna and/or beamforming process) to emphasize the audio captured from a particular direction. In some implementations, the microphone(s) 90 capture ambient acoustic signals preferentially from a first direction (e.g., as compared to at least a second direction that is different from the first direction). For example, the microphone(s) 90 can be configured to capture/emphasize audio preferentially from the front of the frame 20 along a direction parallel to the two arms 40. In some cases, this allows for preferential capture of audio from a direction that coincides with the gaze direction of the user of the device 10. In implementations where the captured audio is played back through the one or more acoustic transducers 80 (possibly with some amplification), this can allow for a user to change a direction of gaze to better hear the sounds coming from that direction, as compared to, for example, sounds coming from other directions. In some implementations, to facilitate such amplification, the electronics 70 includes an amplifier circuit (not shown) that processes signals representing the audio captured using the microphone(s) 90, and generates driver signals for the one or more acoustic transducers 80. In some cases, this can improve the user's perception of speech in noise environments. For example, even a 5-10 dB improvement in the ratio of power from a particular direction to the power from other directions can improve perception of speech, particularly when the improvement is within the speech band (e.g., in the 300-1500 Hz frequency band) of the audio spectrum.

The multiple microphones 90 can be disposed in the corresponding device in various ways. For the example device (audio eyeglasses 10) of FIG. 1, the one or more microphones 90 may be disposed along an arm (or temple) 40 of the eyeglass frame 20. In some implementations, microphone(s) 90 may be disposed in the frontal (lens) region 30 (e.g., on the bridge 60) of the frame 20. In some implementations, the microphone(s) 90 can be separate from any microphones that are disposed for the purpose of capturing the voice of the user (e.g., for spoken commands, phone conversations etc.). In some implementations, one or more microphones(s) 90 can also be used for capturing the voice of the user.

Returning to FIG. 2, the power source 100 can include any conventional power source for a portable electronic device, e.g., an on-board battery or a direct power connector for drawing power from an external source. In some cases, the power source 100 is rechargeable. In particular cases, the power source 100 is coupled with the transducer 80 using at least two conductors.

The controller 110 can include conventional hardware and/or software components for executing program instructions or code according to processes described herein. For example, controller 110 may include one or more processors, memory, communications pathways between components, and/or one or more logic engines for executing program code. Controller 110 can be coupled with other components in the electronics 70 via any conventional wireless and/or hardwired connection which allows controller 110 to send/receive signals to/from those components and control operation thereof.

Figure 3:
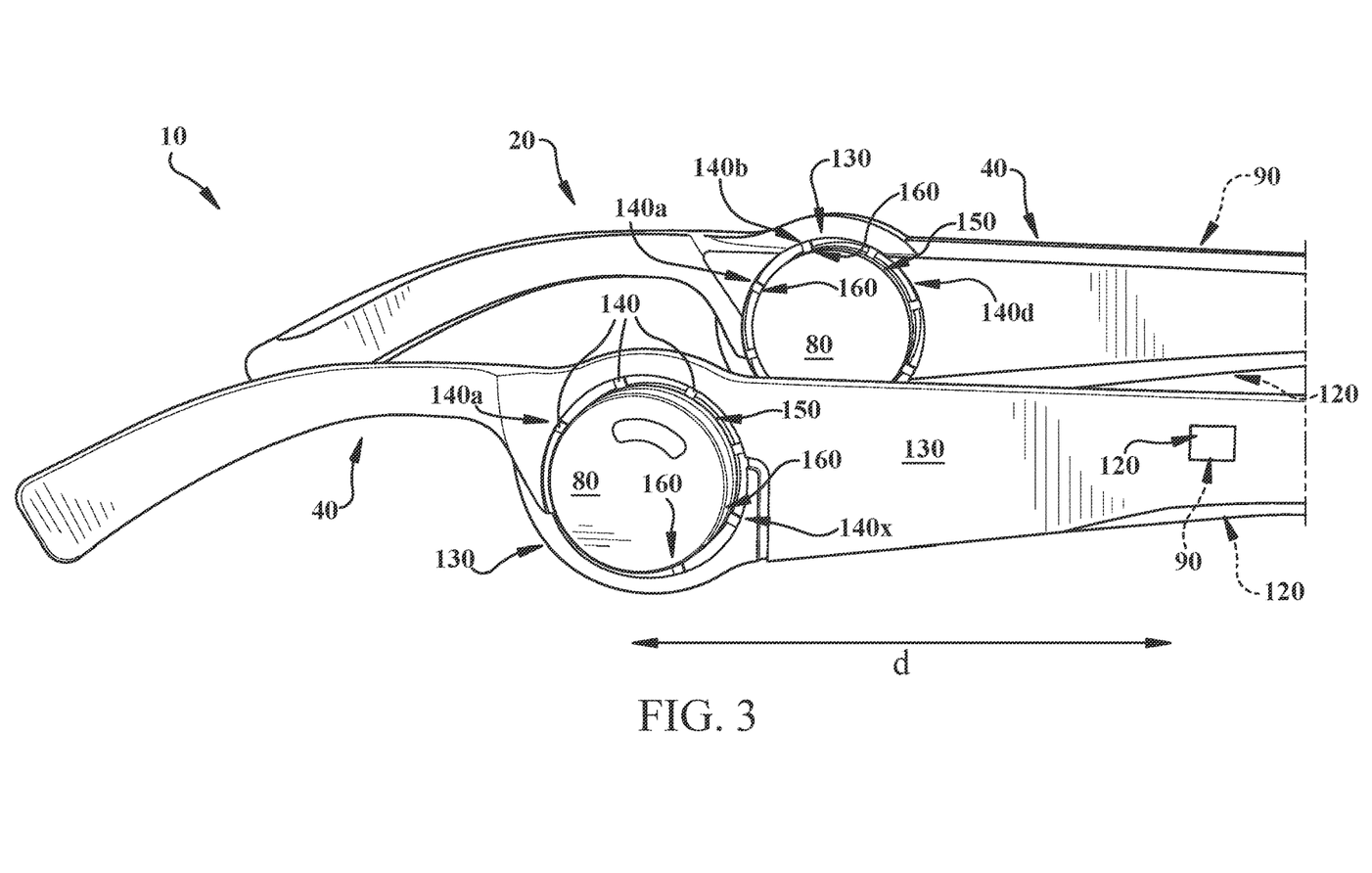
FIG. 3 illustrates a perspective view of an example audio device according to various implementations.

FIG. 3 illustrates a perspective view of a portion of the device (e.g., audio eyeglasses with hearing assistance) 10 according to various implementations. In particular, FIG. 3 illustrates examples of arms 40 in the device 10 of FIG. 1. This depiction illustrates particular physical aspects of the device 10. As shown in this implementation, the device 10 includes the transducers 80 and microphones 90 that are mounted to the frame 20. In particular implementations, the microphones 90 are mounted within the frame 20, e.g., connected to one or more components in the electronics 70 (FIGS. 1 and 2) but are configured to receive acoustic signals from the ambient environment via one or more openings 120 in the frame 20. In particular implementations, the microphone(s) 90 are located on the arm 40 proximate the lens region 30 (FIG. 1). As noted herein, the microphone(s) 90 is configured to capture acoustic signals that are processed and played back through the transducer 80.

The transducers 80 can be mounted on the frame 20, e.g., at a given arm 40. In certain implementations, the transducers 80 are mounted within a casing (or opening) 130 in the arm 40. The transducers 80 are mounted in a location such that when the device 10 is worn by a user, each transducer 80 is proximate one of the user's ears. The transducers 80 are disposed such that, in a head-worn state, the transducer 80 is in an open-ear configuration in which an ear canal of the user of the device 10 is unobstructed.

Each of the transducers 80 and the corresponding microphone(s) 90 on a given arm 40 are separated by a distance (d). It is understood that this separation distance (d) can be based on desired acoustic characteristics in the system, for example, to minimize the acoustic impact of the transducers 80 on the pickup at the microphone(s) 90. In certain implementations, the separation distance (d) is measured along the frame 20 (e.g., as a center-to-center distance along each arm 40), and in particular cases, is equal to at least approximately 5 centimeters. For example, in particular cases, the transducer 80 and microphone(s) 90 are disposed in the (e.g., hearing assistance) device 10 such that, in the head-worn state, a lobe of a radiation pattern of the transducer 80 is directed toward the ear canal of the user, and the microphone 90 is positioned in an acoustic null in the radiation pattern of the transducer 80.

Figure 7:
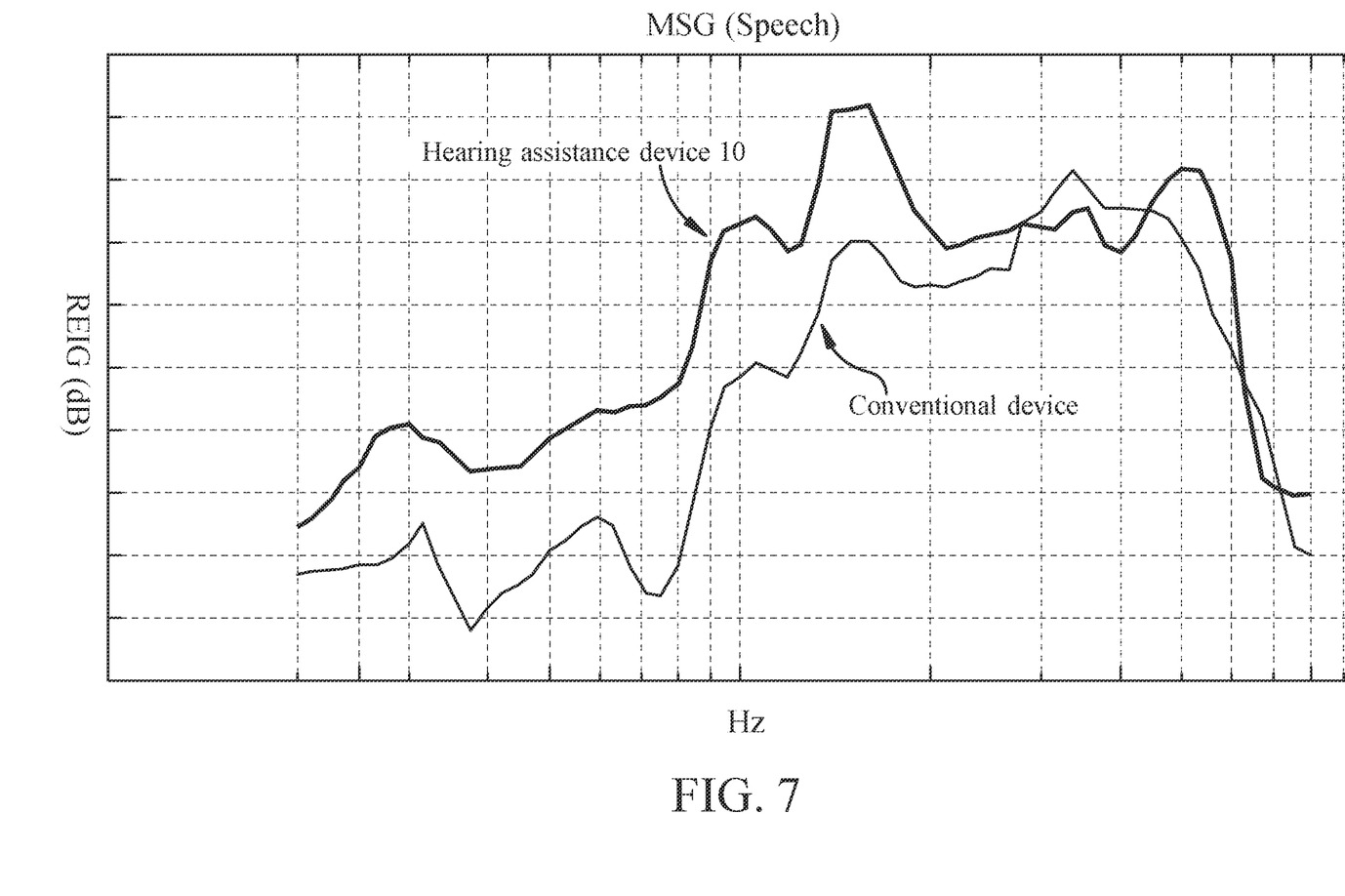
FIG. 7 is a graph illustrating performance features of the audio devices according to various implementations.

As described herein, the device 10 can further include a suspension system 140 for each of the transducers 80 that is coupled to the frame 20 and the corresponding transducer 80. In various implementations, the suspension system 140 is configured to vibrationally isolate the transducer 80 from the microphone(s) 90 that are mounted on the frame 20. In certain cases, the suspension system 140 is configured to provide greatest vibrational isolation across one or more particular frequency ranges of output at the transducer 80. For example, the suspension system 140 can provide the greatest vibrational isolation across the frequency range of output at the transducer 80 of approximately 200 Hertz (Hz) to approximately 4,000 Hz. FIG. 7 illustrates how the suspension system 140 disclosed herein is configured to enhance a real ear insertion gain (REIG) at the microphone(s) 90 across a frequency range, e.g., across the range of approximately 200 Hz to 4,000 Hz as compared with a hearing assistance device that does not include the suspension system 140.

In certain implementations, as illustrated in FIG. 3, the suspension system 140 is located between an outer surface 150 (e.g., outer circumference) of the transducer 80 and the frame 20 (e.g., an inner surface of casing 130) for absorbing vibration from the transducer 80 while providing audio output. That is, during operation of the device 10, the suspension system 140 mitigates detected vibration from the transducer 80 at the microphone(s) 90.

According to some implementations, the suspension system 140 contacts the outer surface 150 of the transducer 80 at a plurality of locations 160. FIG. 3 illustrates one implementation where the suspension system 140 includes a plurality of distinct, physically separated support members 140a-x (selectively labeled for simplicity of illustration). In another implementation, shown in FIG. 4, the suspension system 140 can include a continuous (or, nearly continuous) piece of material that at least partially surrounds the transducer 80. In other implementations, the suspension system 140 includes a plurality of distinct support members that span at least 10, 15 or 20 degrees circumferentially about the outer surface 150 of the transducer 80. In these cases, the suspension system 140 can be formed of two or more separate support members, e.g., two, three, four, five or six support members.

In particular implementations, the suspension system 140 includes a compliant material. In certain aspects, the compliant material includes silicone. In other cases, the compliant material includes foam. The suspension system 140 can also be formed from a number of additional compliant materials. In certain cases, as noted herein, the suspension system 140 includes an additively manufactured material.

Figure 4:
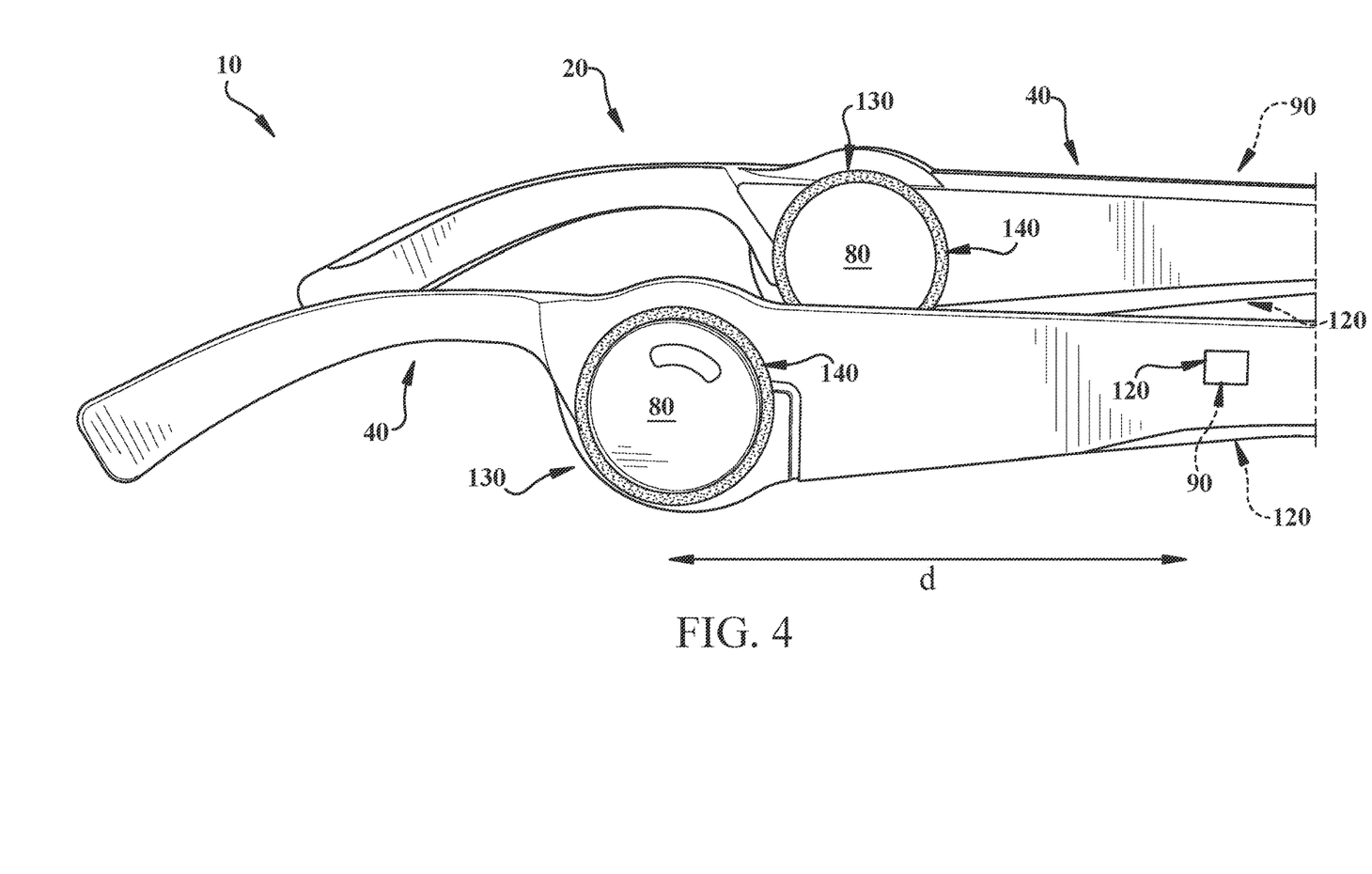
FIG. 4 illustrates a perspective view of an additional implementation of an audio device according to various implementations.
Figure 5:
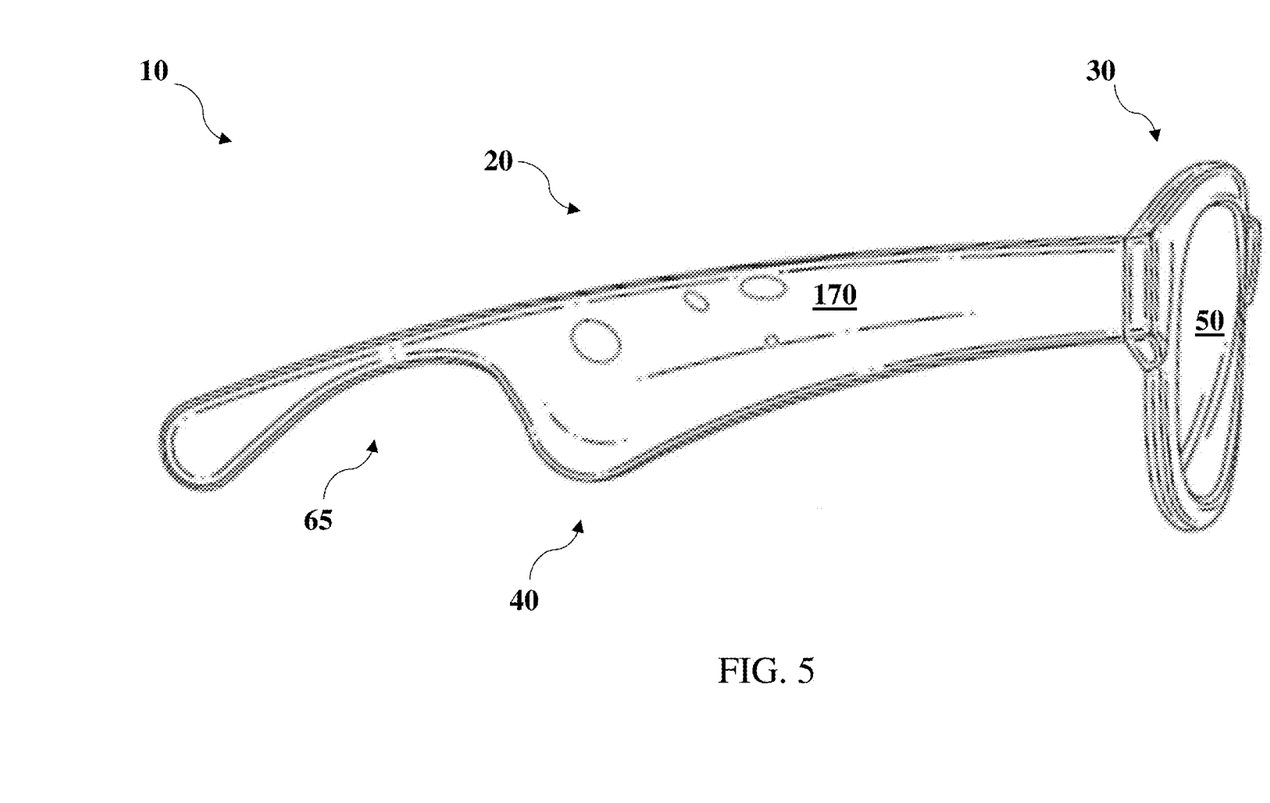
FIG. 5 illustrates a side perspective view of an audio device according to various implementations.

While the depictions of a device 10 (e.g., hearing assistance device) in FIGS. 3 and 4 show an exposed portion of the transducer 80, it is understood that in various implementations, the transducer 80 is substantially hidden from view, e.g., such that a side view of the (e.g., hearing assistance) device 10 does not show the transducer 80 and/or the suspension system 140. FIG. 5 illustrates a side view of the device 10 with an outer casing 170 that covers the transducer 80, and in some cases, also obstructs view of the microphone(s) 90 and other electronics 70 (FIG. 1).

Figure 6:
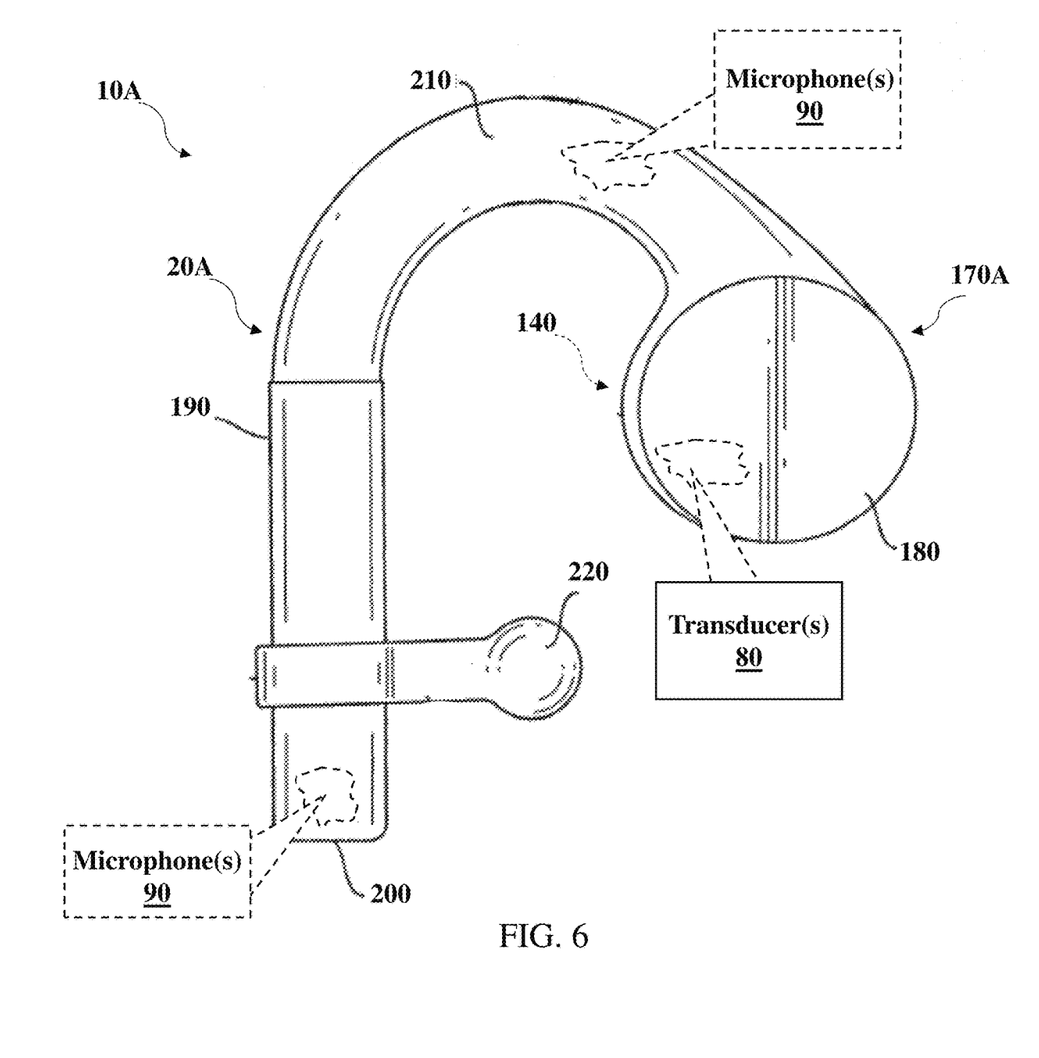
FIG. 6 illustrates a side view of an over-ear audio device according to various implementations.

FIG. 6 illustrates another implementation of an audio device 10A, including a frame 20A such as an over-ear audio device frame. That is, the device 10A illustrated in FIG. 6 is an over-ear audio device (e.g., a hearing assistance device)

configured to wrap over the ear of a user. The device 10A is illustrated including at least one transducer 80 and microphone(s) 90 similar to those described with respect to the eyeglass style device in FIG. 1. In particular implementations, the transducer 80 is located in a forward portion 180 of the frame 20A that is configured to output audio toward the user's ear canal. In some cases, microphone(s) 90 are located in a housing 190 configured to rest on and/or behind the user's ear. Microphone(s) 90 can be located in a lower portion 200 of the frame 20A (e.g., a boom microphone), and/or proximate an arc portion 210 (e.g., forward of the peak of the arc), and are depicted in both locations in phantom. As noted with respect to device 10, the transducer(s) 80 can be located in an outer casing 170A that houses both the transducer 80 and the suspension system 140, both of which are obstructed from view in this depiction. This example device 10A further includes a stabilizing member 220 for retaining the device 10A on the user's ear.

Particular implementations can include a method of manufacturing the suspension system 140, including: a) additively manufacturing a compliant material configured to fit between the outer surface 150 of the transducer 80 and the frame 20 of the device 10. In particular implementations, the additively manufactured compliant material is formed by conventional three-dimensional (3D) printing processes, for example, using a computerized additive manufacturing system. Example additive manufacturing processes, which can be performed using a computerized additive manufacturing system, include: powder bed fusion (e.g., electron beam melting (EBM), selective heat sintering (SHS), selective laser melting (SLM) or selective laser sintering (SLS)), material extrusion (e.g., fuse deposition modeling (FDM)), and/or jetting (e.g., material jetting or binder jetting). After additively manufacturing the compliant material, the process can further include: b) coupling the compliant material to the transducer 80 and the frame 20 such that the compliant material at least partially surrounds the transducer 80. In certain implementations, as noted herein, the compliant material is coupled to the transducer 80 and the frame 20 at a plurality of locations 160 around the transducer 80. In some cases, the compliant material is coupled to the transducer 80 and the frame 20 using an adhesive. In other cases, the compliant material is press-fit or otherwise force-fit between the frame 20 and the transducer 80.

In particular cases, program code representative of the suspension system 140 is stored on a computer readable storage medium that is physically generated when the code is executed by a computerized additive manufacturing (AM) system. In these cases, the program code can include a set of computer-executable instructions for operating a computerized AM system, and a set of computer-executable instructions (also known as, object code) defining AM components such as the suspension system 140 to be physically generated by computerized additive manufacturing system. As described herein, AM processes begin with a non-transitory computer readable storage medium (e.g., memory) storing program code. The computer-executable instructions for operating computerized AM system can include any conventional software code capable of operating a computerized AM system.

The object code defining AM component(s) such as the suspension system 140 can include a precisely defined 3D model of an AM component and can be generated from any of a large variety of well-known computer aided design (CAD) software systems such as AutoCAD®, TurboCAD®, DesignCAD 3D Max, etc. For example, the object code may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional AM component to be fabricated on any AM printer. Object code representative of AM component(s) may also be converted into a set of data signals and transmitted, received as a set of data signals and converted to code, stored, etc., as necessary. In any event, object code may be an input to a computerized AM system and may come from a part designer, an intellectual property (IP) provider, a design company, the operator or owner of a computerized AM system, or from other sources.

The out-loud audio devices disclosed according to various implementations are configured to vibrationally isolate transducers from microphones to enhance acoustic signal pickup. These implementations enable high-performance audio devices in an out-loud form factor. While descriptions and characterizations of devices according to various implementations include hearing assistance devices, the inventive principles are applicable to any audio device for which reduced microphone pickup from a loudspeaker is desired, e.g., a reduced echo component via mechanical isolation.

The term "approximately" as used herein can allot for a nominal variation from absolute values, e.g., of approximately 3 degrees or less.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Elements of figures are shown and described as discrete elements in a block diagram. These may be implemented as one or more of analog circuitry or digital circuitry. Alternatively, or additionally, they may be implemented with one or more microprocessors executing software instructions. The software instructions can include digital signal processing instructions. Operations may be performed by analog circuitry or by a microprocessor executing software that performs the equivalent of the analog operation. Signal lines may be implemented as discrete analog or digital signal lines, as a discrete digital signal line with appropriate signal processing that is able to process separate signals, and/or as elements of a wireless communication system.

When processes are represented or implied in the block diagram, the steps may be performed by one element or a plurality of elements. The steps may be performed together or at different times. The elements that perform the activities may be physically the same or proximate one another, or may be physically separate. One element may perform the actions of more than one block. Audio signals may be encoded or not, and may be transmitted in either digital or analog form. Conventional audio signal processing equipment and operations are in some cases omitted from the drawings.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

Other embodiments not specifically described herein are also within the scope of the following claims. Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

We claim:

1. A wearable out-loud audio device comprising:
   a frame, wherein the frame comprises a glasses frame comprising a set of arms for resting over a user's respective ears, and a lens region spanning between the arms;
   a transducer mounted to the frame,
   wherein the transducer is located on at least one of the arms proximate one of the user's ears, the transducer being mounted within an opening in the arm, and wherein the transducer is disposed such that, in a head-worn state, the transducer is in an open-ear configuration in which an ear canal of a user of the device is unobstructed;
   a microphone mounted to the frame and separated from the transducer by a distance; and
   a suspension system for the transducer to vibrationally isolate the transducer from the microphone, wherein the suspension system includes a compliant material and is located between an outer surface of the transducer and an inner surface of the opening in the arm, and wherein the suspension system includes a plurality of distinct, physically separated support members.

2. The device of claim 1, wherein the microphone is located on the at least one arm proximate the lens region, and wherein the distance is measured along the frame.

3. The device of claim 1, wherein the distance between the microphone and the transducer is equal to at least approximately 5 centimeters as measured along the frame.

4. The device of claim 1, wherein during operation of the device, the suspension system provides greatest vibrational isolation across a frequency range of output at the transducer of approximately 200 Hertz (Hz) to approximately 4,000 Hz.

5. The device of claim 1, wherein the suspension system comprises silicone or foam.

6. The device of claim 1, further comprising:
   a power source located in at least one of the arms in the frame; and
   at least two conductors within at least one of the arms coupling the power source to the transducer.

7. The device of claim 1, wherein the suspension system mitigates detected vibration from the transducer at the microphone.

8. The device of claim 1, further comprising at least one additional transducer mounted to the frame, and at least one additional suspension system to vibrationally isolate the additional transducer from the microphone.

9. The device of claim 1,
   wherein the microphone is configured to capture acoustic signals that are processed and played back through the transducer, and
   wherein the transducer and the microphone are disposed in the device such that, in the head-worn state, a lobe of a radiation pattern of the transducer is directed towards the ear canal of the user, and the microphone is positioned in an acoustic null in the radiation pattern of the transducer.

10. The device of claim 1, wherein the physically separated support members each span at least 10 degrees circumferentially about the outer surface of the transducer.

11. An audio eyeglass device, comprising:
    a frame comprising a lens region and a pair of arms extending from the lens region for positioning over a user's ears;
    at least one transducer mounted on the pair of arms and positioned proximate the user's temple region in a head-worn state, the at least one transducer being mounted within an opening in at least one of the arms, and wherein the transducer is disposed such that, in a head-worn state, the transducer is in an open-ear configuration in which an ear canal of a user of the device is unobstructed;
    a microphone mounted to the frame and separated from the transducer by a distance; and
    a suspension system for the transducer to vibrationally isolate the transducer from the microphone, wherein the suspension system includes a compliant material and is located between an outer surface of the transducer and an inner surface of the opening in the arm, and wherein the suspension system includes a plurality of distinct, physically separated support members.

12. The device of claim 11,
    wherein the microphone is configured to capture acoustic signals that are processed and played back through the transducer, and
    wherein the at least one transducer and the microphone are disposed in the device such that, in the head-worn state, a lobe of a radiation pattern of the transducer is directed towards the ear canal of the user, and the microphone is positioned in an acoustic null in the radiation pattern of the transducer.

13. The device of claim 11, further comprising:
    an additional transducer,
    wherein the transducer is mounted within a first one of the pair of arms and the additional transducer is mounted within a second one of the pair of arms, wherein the compliant material of the suspension system substantially surrounds the transducer and contacts the outer surface of the transducer and an inner surface of a corresponding opening in each of the pair of arms.

14. The device of claim 11, wherein during operation of the device, the suspension system provides greatest vibrational isolation across a frequency range of output at the transducer of approximately 200 Hertz (Hz) to approximately 4,000 Hz, and wherein the suspension system enhances a real ear insertion gain (REIG) at the microphone across the frequency range.

15. The device of claim 11, wherein the suspension system is directly coupled to the frame and the transducer.

16. The audio eyeglass device of claim 11, wherein the physically separated support members each span at least 10 degrees circumferentially about the outer surface of the transducer.

17. A wearable out-loud audio device comprising:
a frame;
a transducer mounted to the frame within an opening in the frame;
a microphone mounted to the frame and separated from the transducer by a distance; and
a suspension system for the transducer to vibrationally isolate the transducer from the microphone, wherein the suspension system includes a compliant material and is located between an outer surface of the transducer and an inner surface of the opening in the frame, and wherein the suspension system includes a plurality of distinct, physically separated support members,
wherein the transducer is disposed such that, in a head-worn state, the transducer is in an open-ear configuration in which an ear canal of a user of the device is unobstructed, wherein the microphone is configured to capture acoustic signals that are processed and played back through the transducer, and wherein the transducer and the microphone are disposed in the device such that, in the head-worn state, a lobe of a radiation pattern of the transducer is directed towards the ear canal of the user, and the microphone is positioned in an acoustic null in the radiation pattern of the transducer.

18. The wearable out-loud audio device of claim 17, wherein the physically separated support members each span at least 10 degrees circumferentially about the outer surface of the transducer.

* * * * *